UNITED STATES PATENT OFFICE.

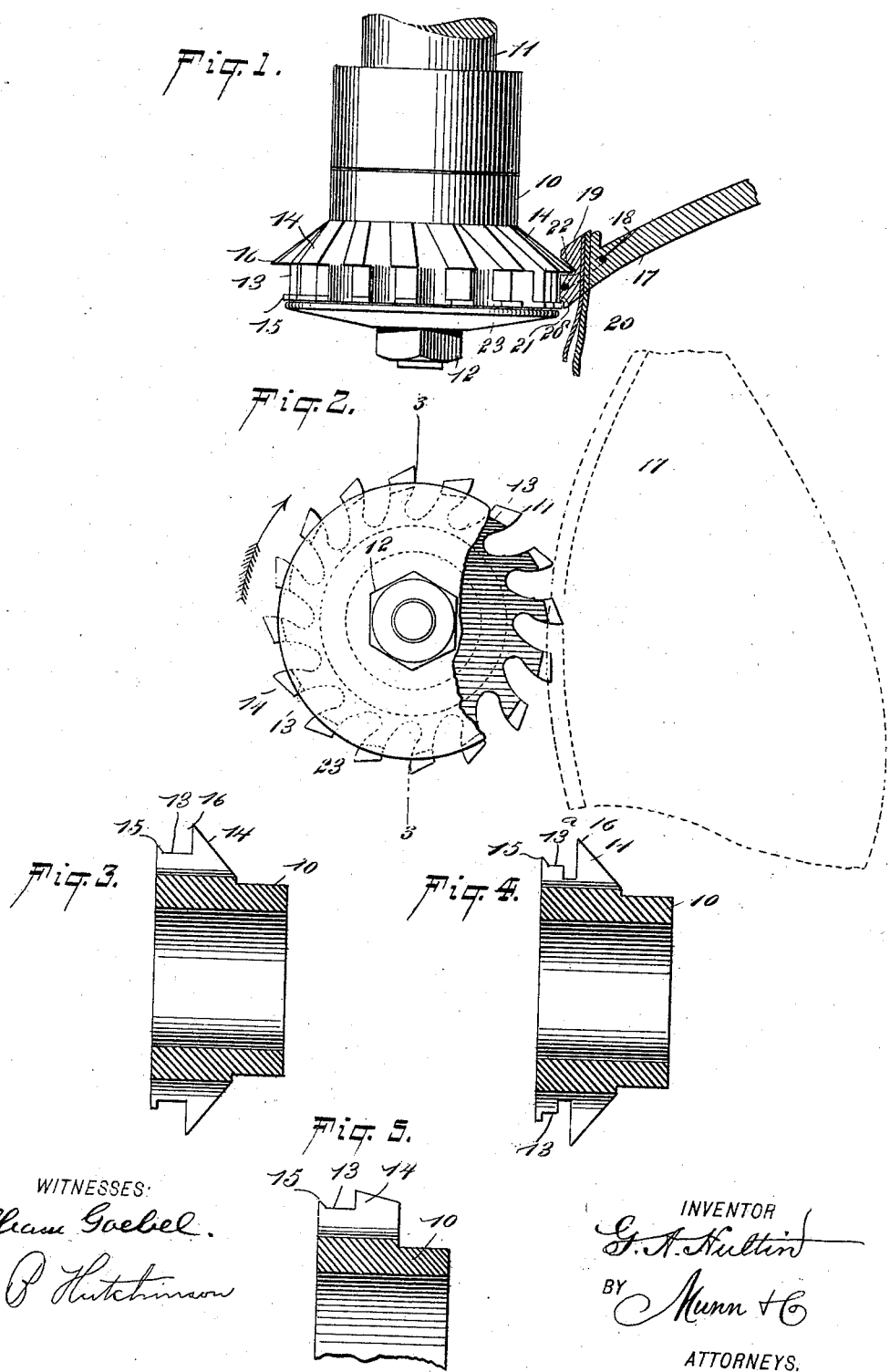

GUSTAF ADOLF HULTIN, OF CHICAGO, ILLINOIS.

CUTTER FOR WELT-TRIMMERS.

SPECIFICATION forming part of Letters Patent No. 542,562, dated July 9, 1895.

Application filed November 22, 1894. Serial No. 529,594. (No model.)

*To all whom it may concern:*

Be it known that I, GUSTAF ADOLF HULTIN, of Chicago, in the county of Cook and State of Illinois, have invented a new and Improved Cutter for Welt-Trimmers, of which the following is a full, clear, and exact description.

My invention relates to improvements in that class of trimming-machines which are used for trimming the welts of shoe-soles which are adapted to be provided with cork soles; and the object of my invention is to produce an extremely simple and cheap cutter for such trimmers, which is adapted to rapidly, nicely, and simultaneously trim the welt and cut a channel for the second inseaming therein.

A further object of my invention is to produce a cutter which may be very easily ground or made to trim the welts to any desired shape.

To these ends my invention consists of a cutter, the construction of which will be hereinafter described and claimed.

Reference is to be had to the accompanying drawings, forming a part of this specification, in which similar figures indicate corresponding parts in all the views.

Figure 1 is a plan view of the complete cutter as applied to the welt of a shoe-sole, the welt and sole being shown in section. Fig. 2 is a broken end view of the cutter. Fig. 3 is a detail longitudinal section of the same. Fig. 4 is a similar section of a modified form of cutter; and Fig. 5 is a detail sectional view showing still another modification of the cutter, Figs. 4 and 5 illustrating two of many modifications of shape which may be given to the cutting-knives.

The cutter is formed on the collar 10, which is adapted to be secured to a shaft 11, being fastened, as illustrated, by a nut 12, fitting a reduced end of the shaft; but any suitable means may be used for securing the collar to the shaft. The collar is provided with parallel rows of circumferential knives 13 and 14, each pair of knives 13 and 14 being in the same radial and longitudinal planes, but being separated from the next pair of said knives by a sufficient space to provide for clearance, as best shown in Fig. 2, and the knives 14 project outward farther from the collar 10 than the knives 13. The knives 13 have at their outer ends small lips 15, which are adapted to come in contact with the upper edge of the welt, as shown in Fig. 1; but which, if desired, may be made to overlap the said edge and serve as a guide for the welt when the latter is held against the cutter. The cutter may be used to advantage without the lip 15.

The knives 14 have their cutting-edges very much inclined, as shown best in Figs. 1 and 3, so that each knife comes to a point, as shown at 16, at the edge next the knife 13, and this shape of the knives 14 enables them to cut a nice channel in the welt for the second inseaming, as presently described; but it will be understood that the cutting-edges of the knives 14 may be made parallel with the axis of the cutter or may be made to extend at any desired angle thereto. The knives 13 may also be made very much narrower, as shown at 13ª in Fig. 4. When the cutter is applied to its shaft a circular guide-plate 23 is placed against the outer end of the cutter and held in place by the nut 12.

In the drawings the shoe-sole 17 has the customary channel 18 for the first inseaming, by which the welt 19 is fastened to the sole, and the upper 20 and the cover 20ª for the welt are held between the welt and the sole in the customary manner. It is necessary to trim up the outer edge of the welt and provide a channel for the second inseaming, which is made after the cover is turned down over the welt, and to enable the channel and trimming to both be done the above-described cutter is used, which, when operated, is set in rapid rotation, and the welt to be trimmed and channeled is drawn along against the cutter, and the upper portion of the outer edge of the welt is trimmed by the knives 13, as shown at 21 in Fig. 1, while the channel 22 for the second inseaming is made by the knives 14, as the drawings clearly show.

I have shown the cutter applied to a horizontal shaft; but it will of course be understood that it may be applied to a vertical shaft, if preferred.

Having thus described my invention, I claim as new and desire to secure by Letters Patent—

1. A cutter for welt trimmers, comprising a cutter or head having parallel rows of peripheral knives, the rows being of dissimilar lengths, and the longer knives having their cutting edges inclined outwardly and downwardly from the edge next to the shorter knives, substantially as described.

2. A cutter for welt trimmers, having parallel rows of peripheral knives of dissimilar lengths, the shorter knives being straight edged and provided with lips at their outer ends and the longer knives having their cutting edges inclined outwardly and downwardly from the edge next to the shorter knives, substantially as described.

GUSTAF ADOLF HULTIN.

Witnesses:
ERICK J. JOHNSON,
E. GUSTAFSON.